Figures 1, 2, 3:
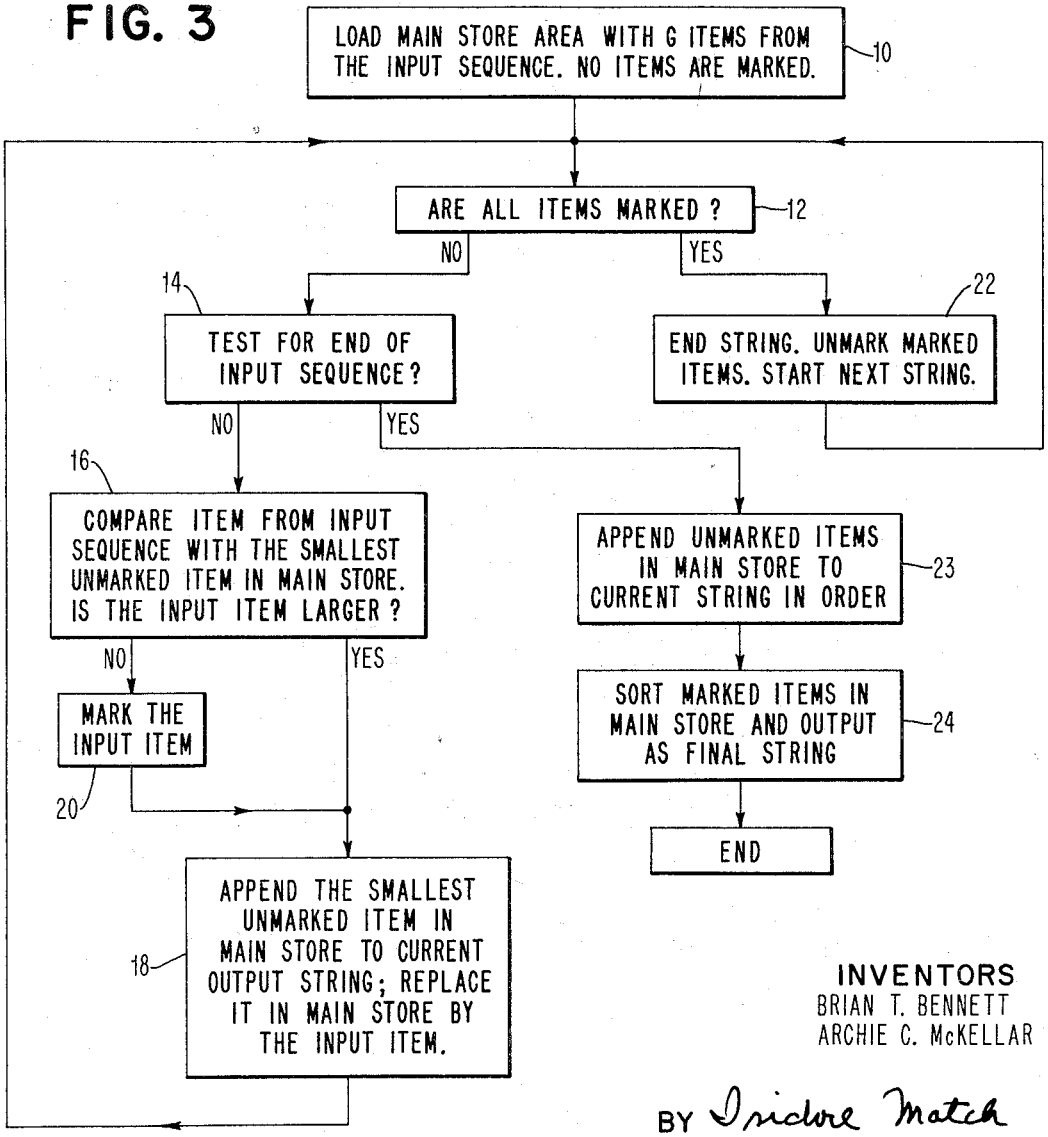
Figures 4, 5A, 5B, 5C, 6A, 6B:
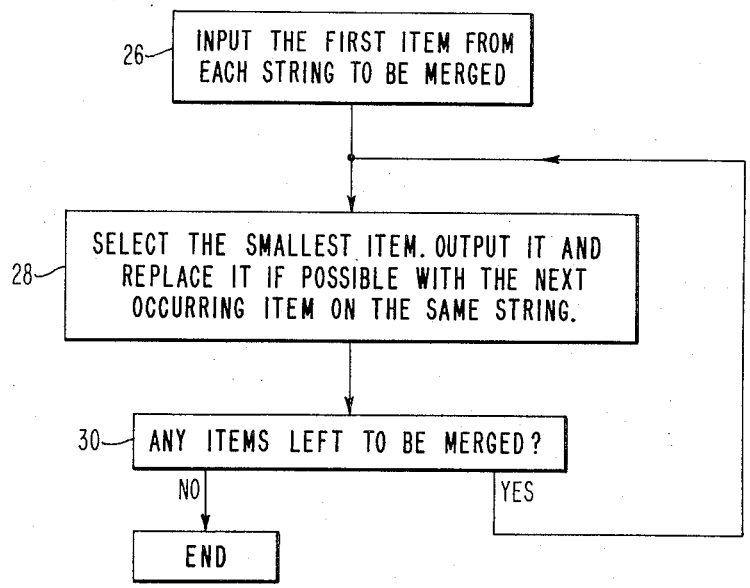
Figure 7:
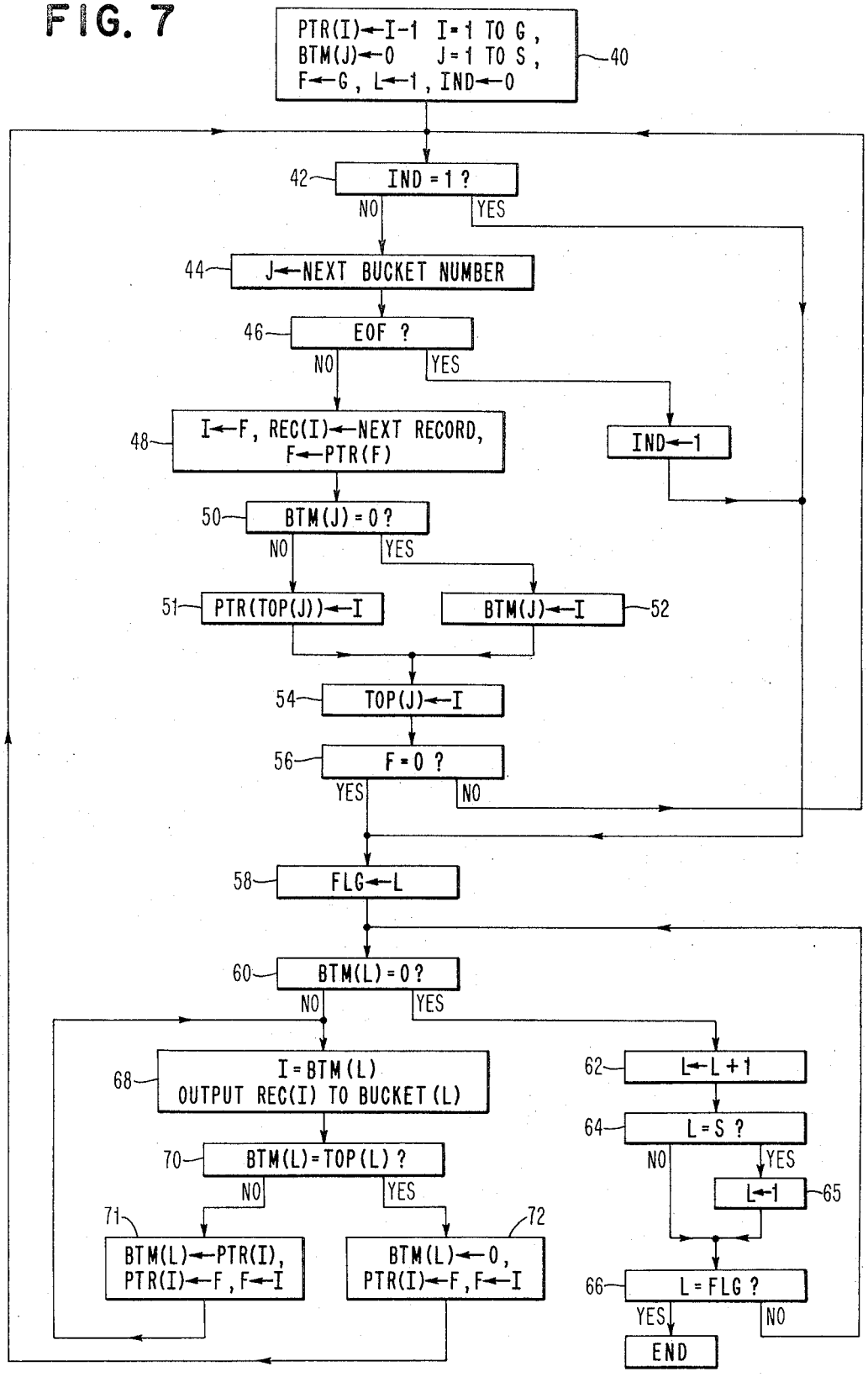
Figure 13A:
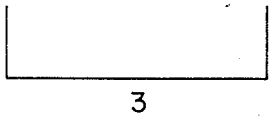
Figure 14A:
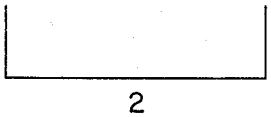
Figure 15A:
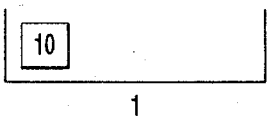
Figure 13B:
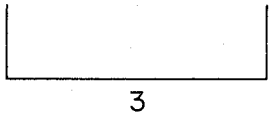
Figure 14B:
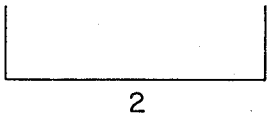
Figure 15B:
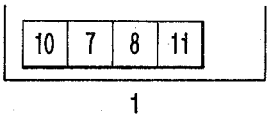
Figure 13C:
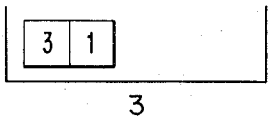
Figure 14C:
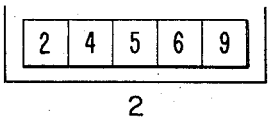
Figure 15C:
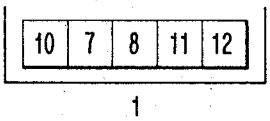
Figure 17:
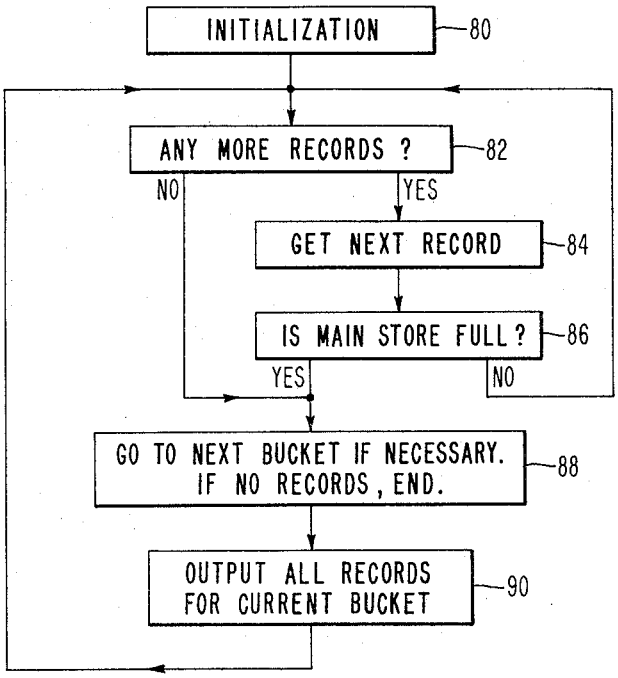
Figure 18:
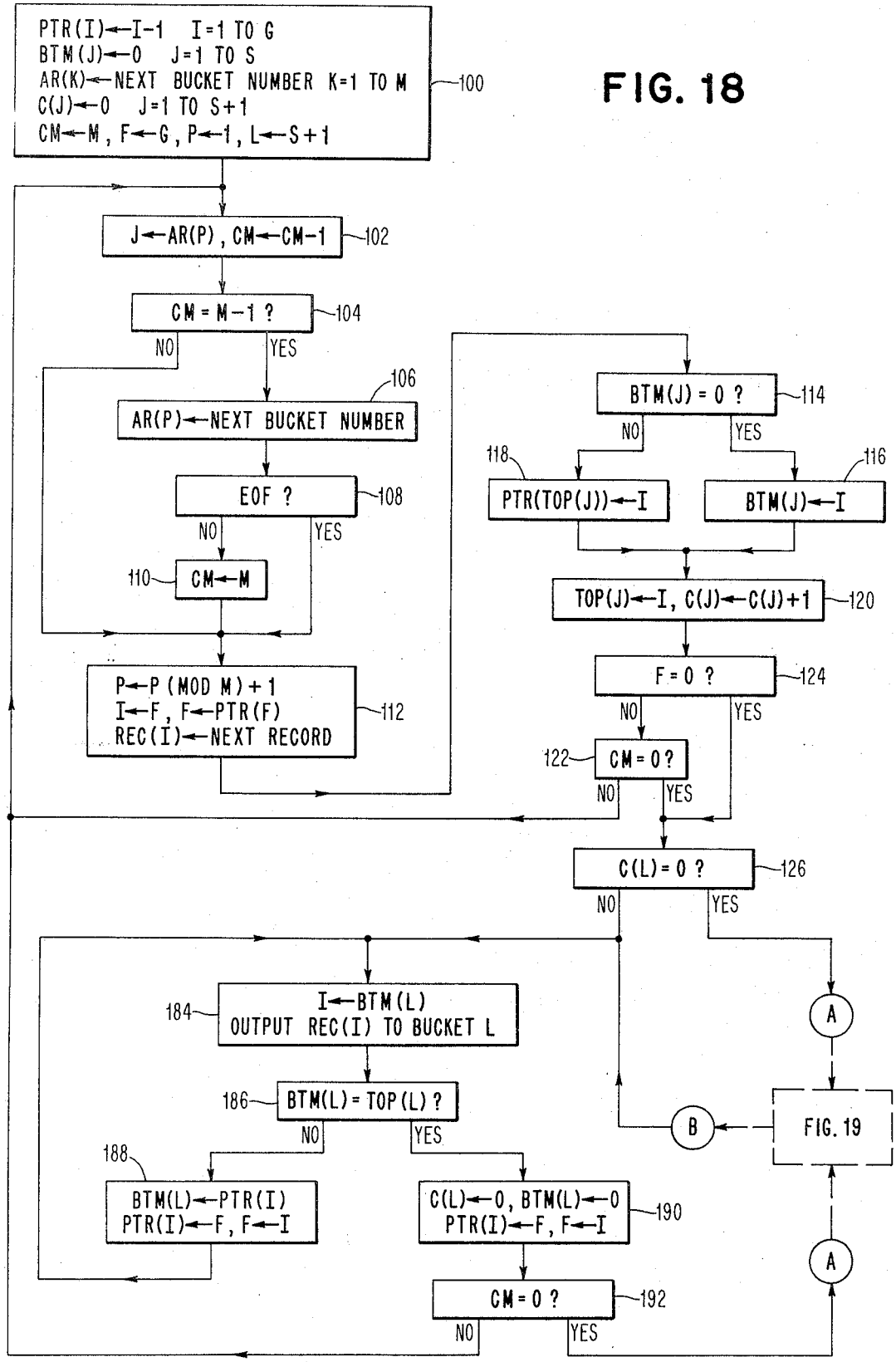
Figures 19, 19A:
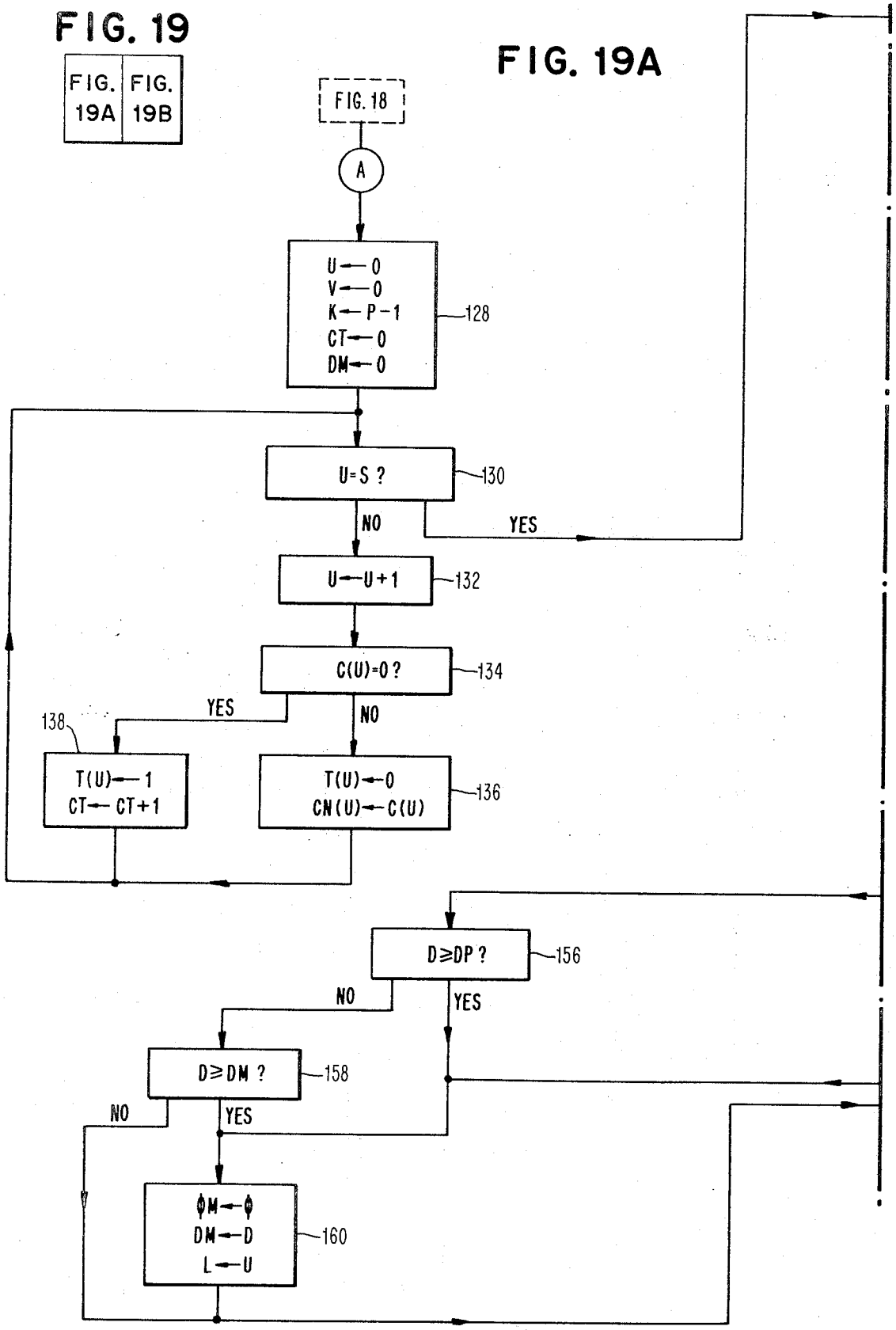
Figures 18, 19B:
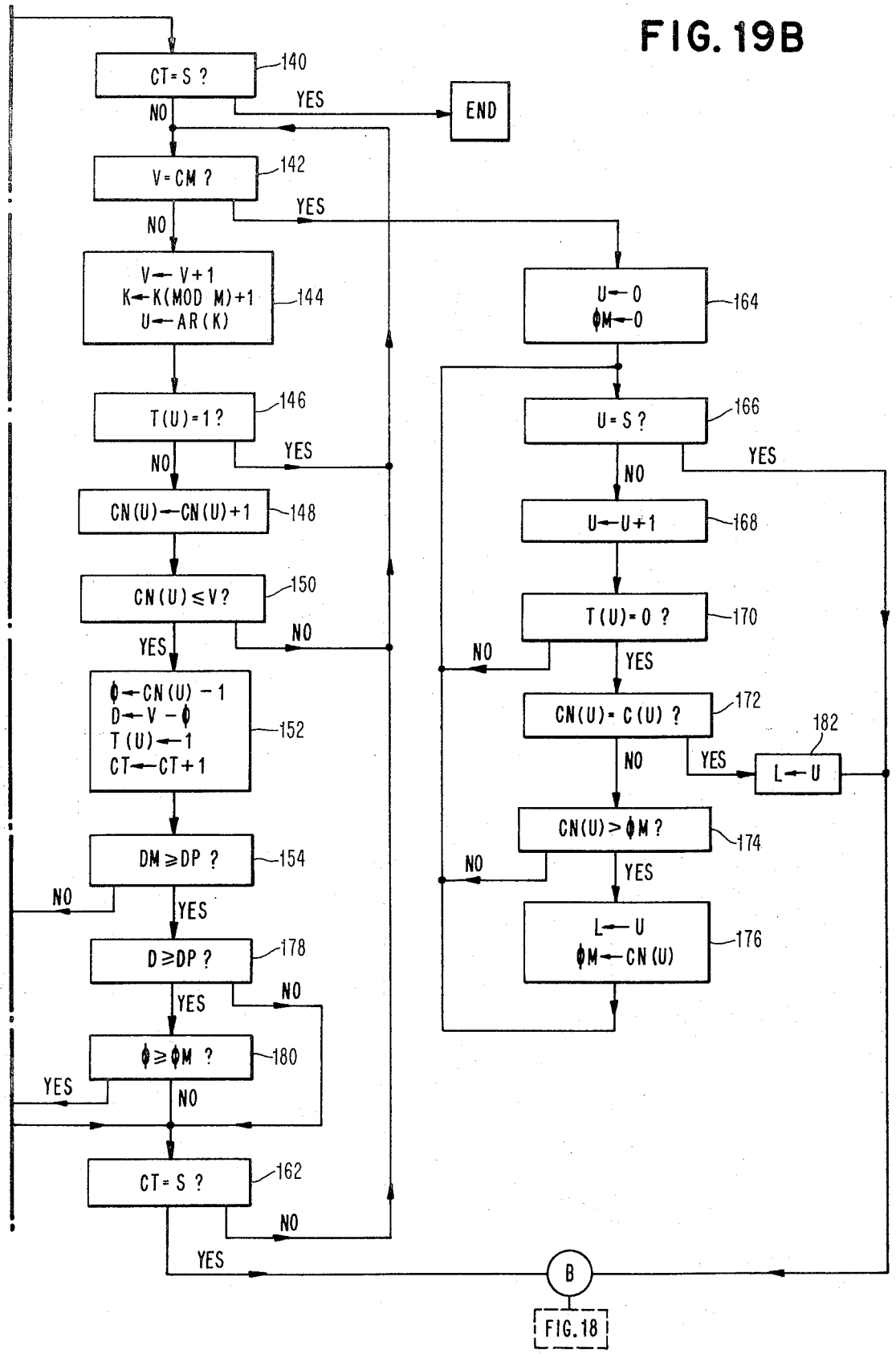
Figures 26A, 27A, 27B, 28A, 28B, 29A, 29B, 30A, 30B, 31:
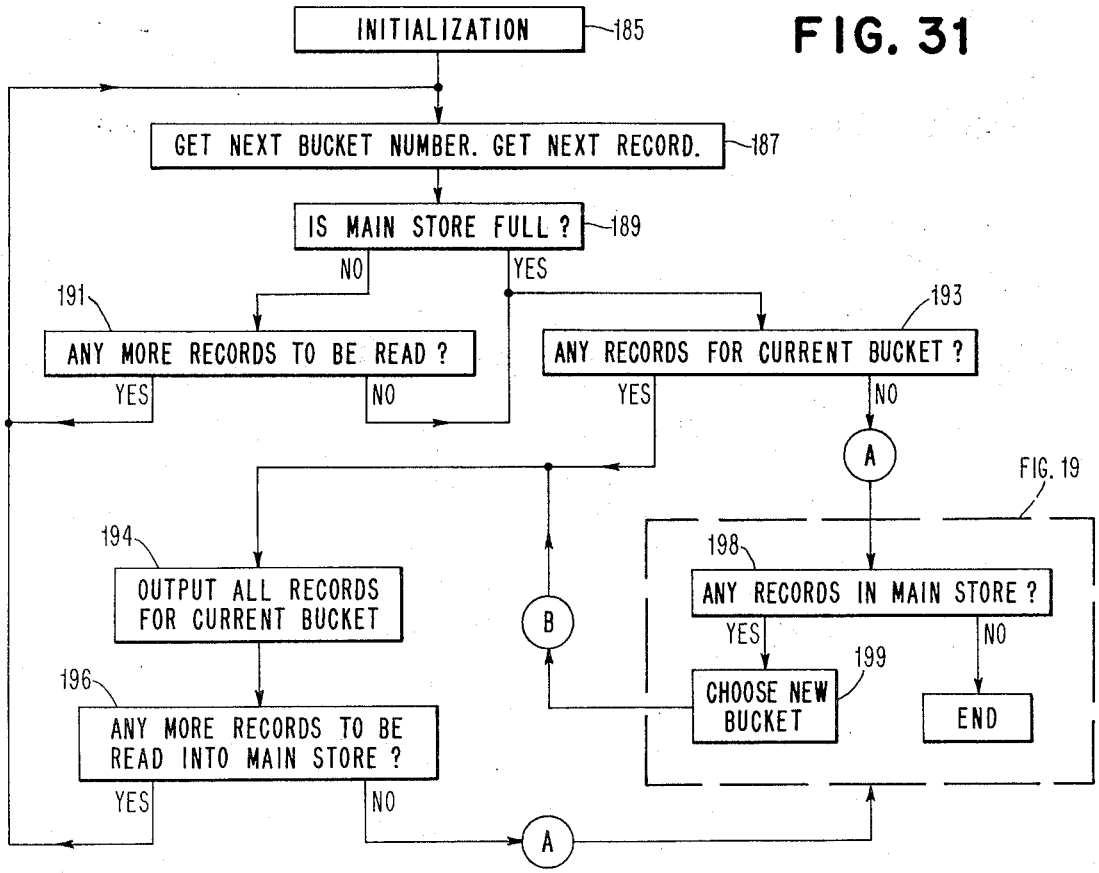
Figures 32, 32A, 32B:
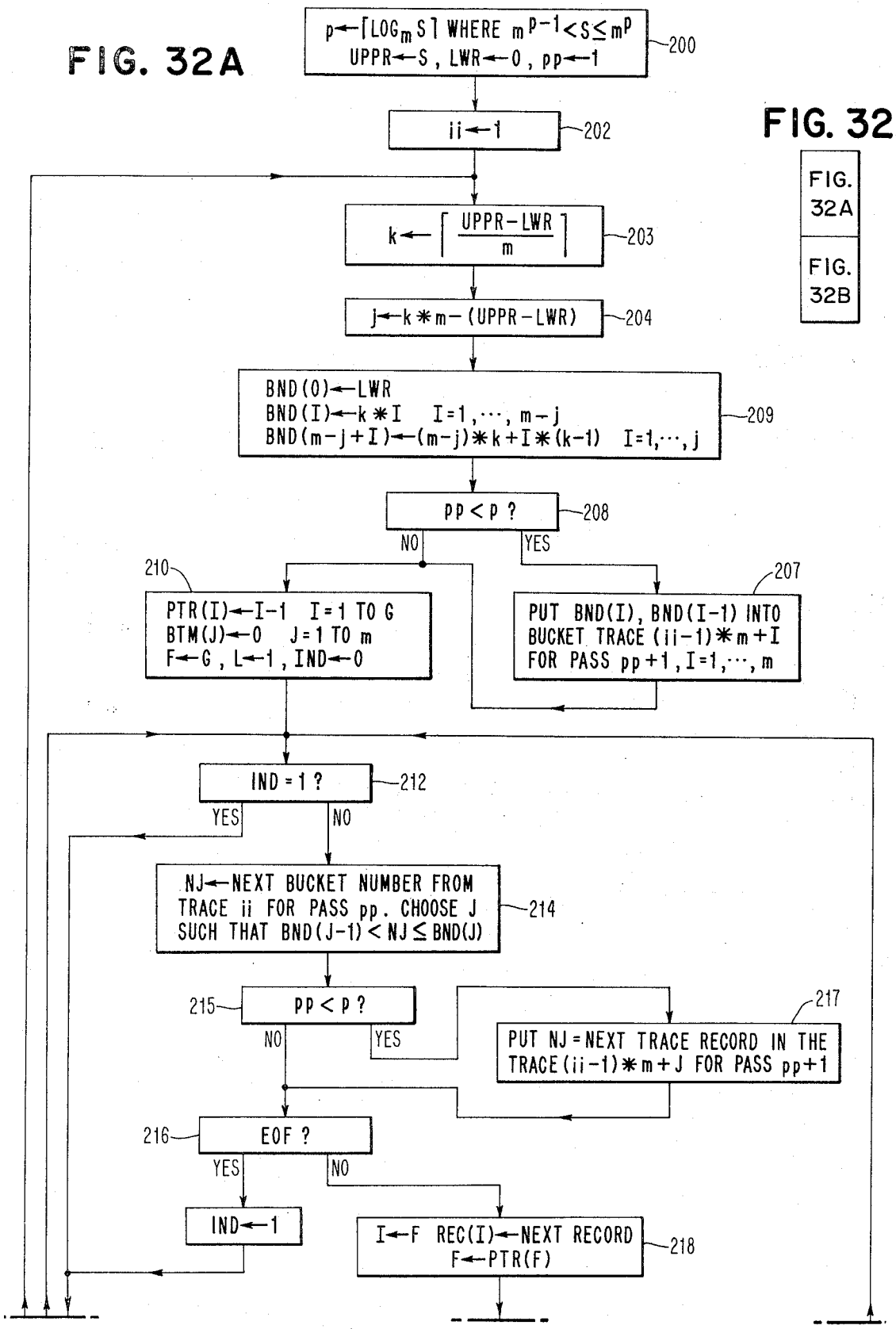
Figure 32B:
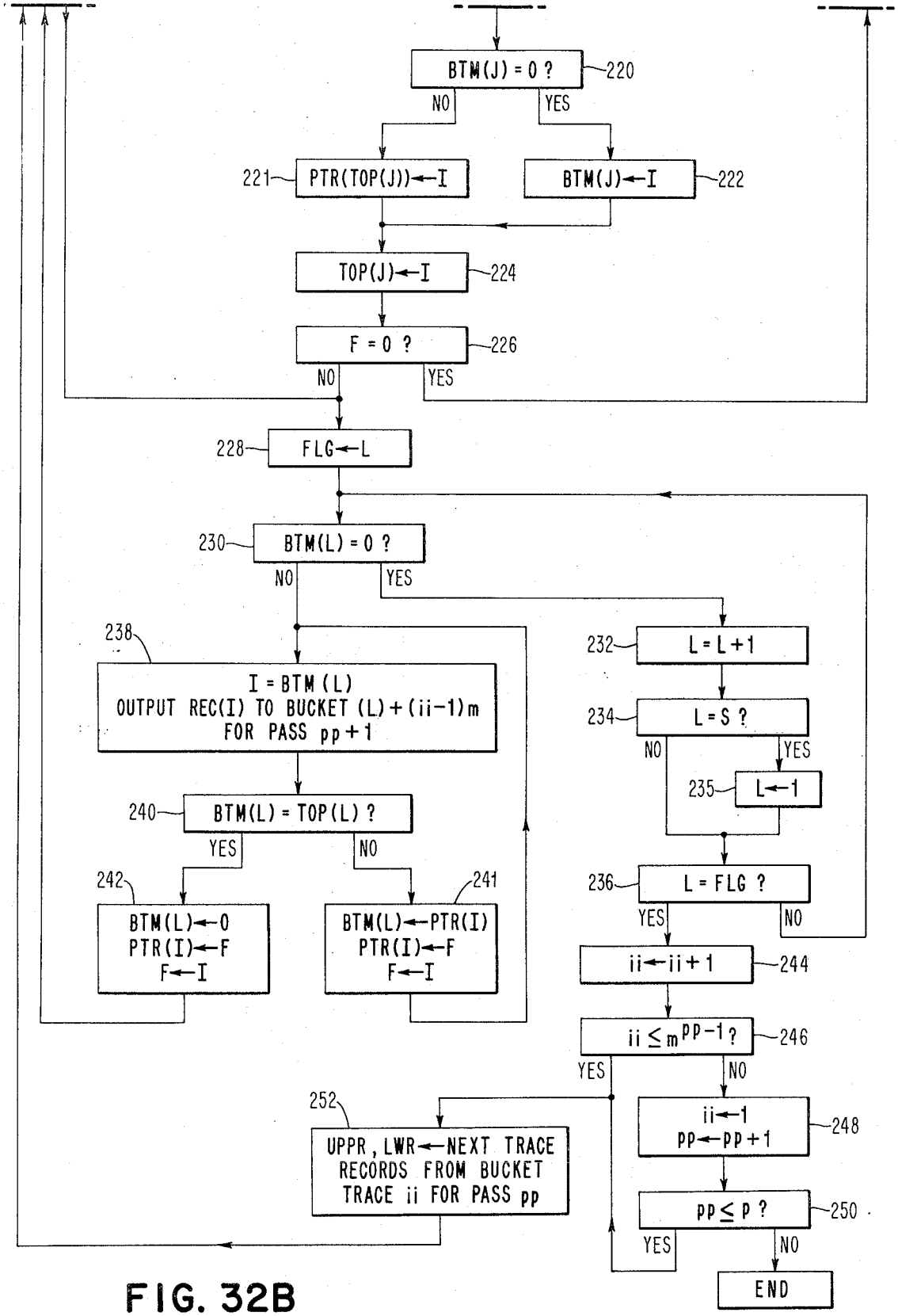
Figure 39:
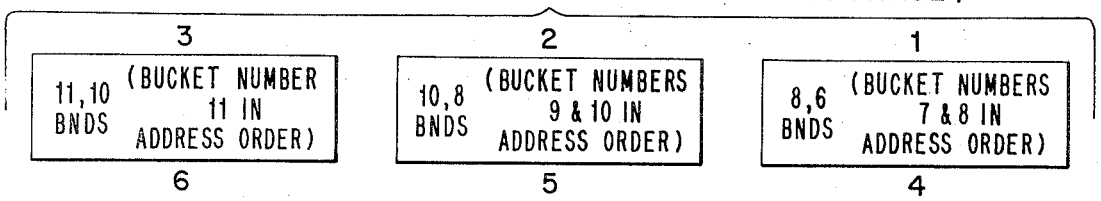
Figure 40:
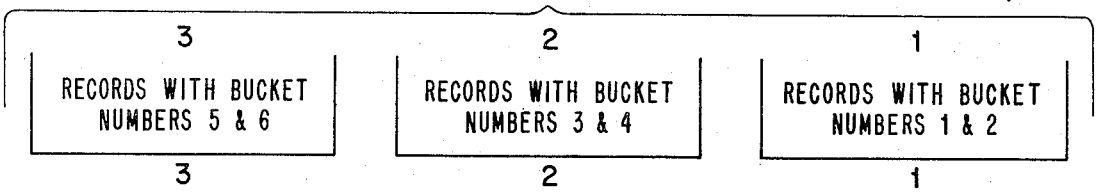
Figure 41:
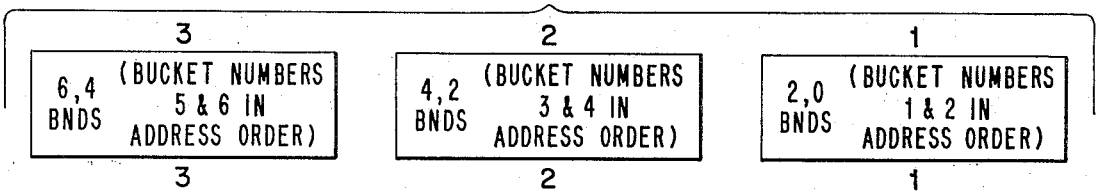
Figure 42:
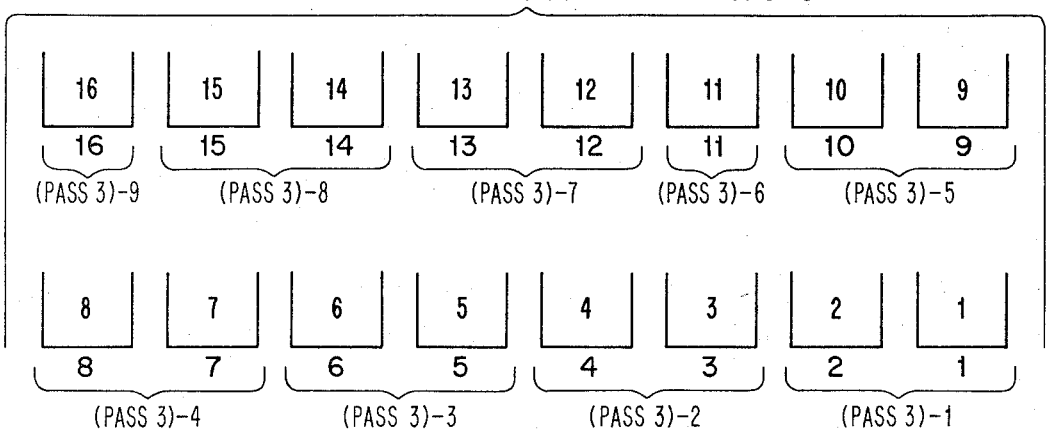
Figure 43:
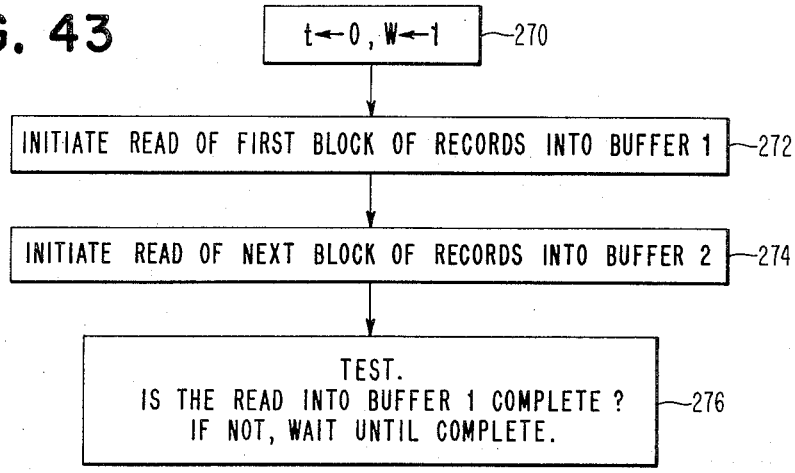
Figure 44:
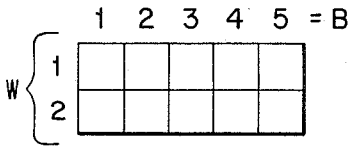
Figure 45:
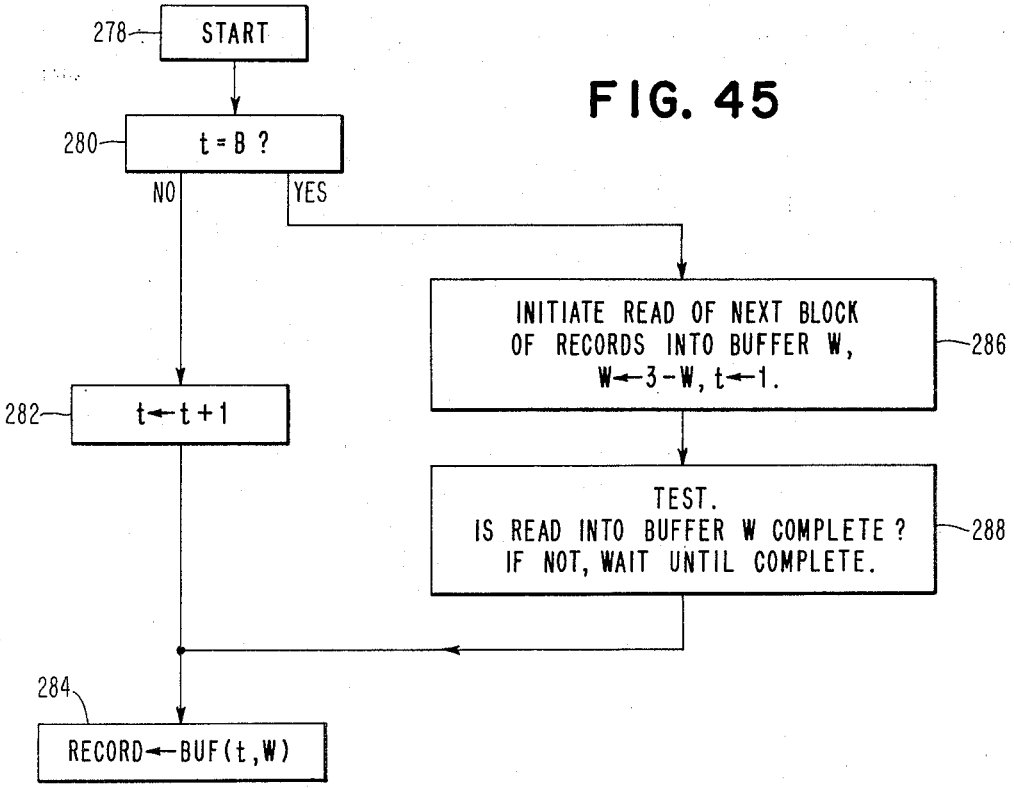
Figures 46, 46A, 46B:
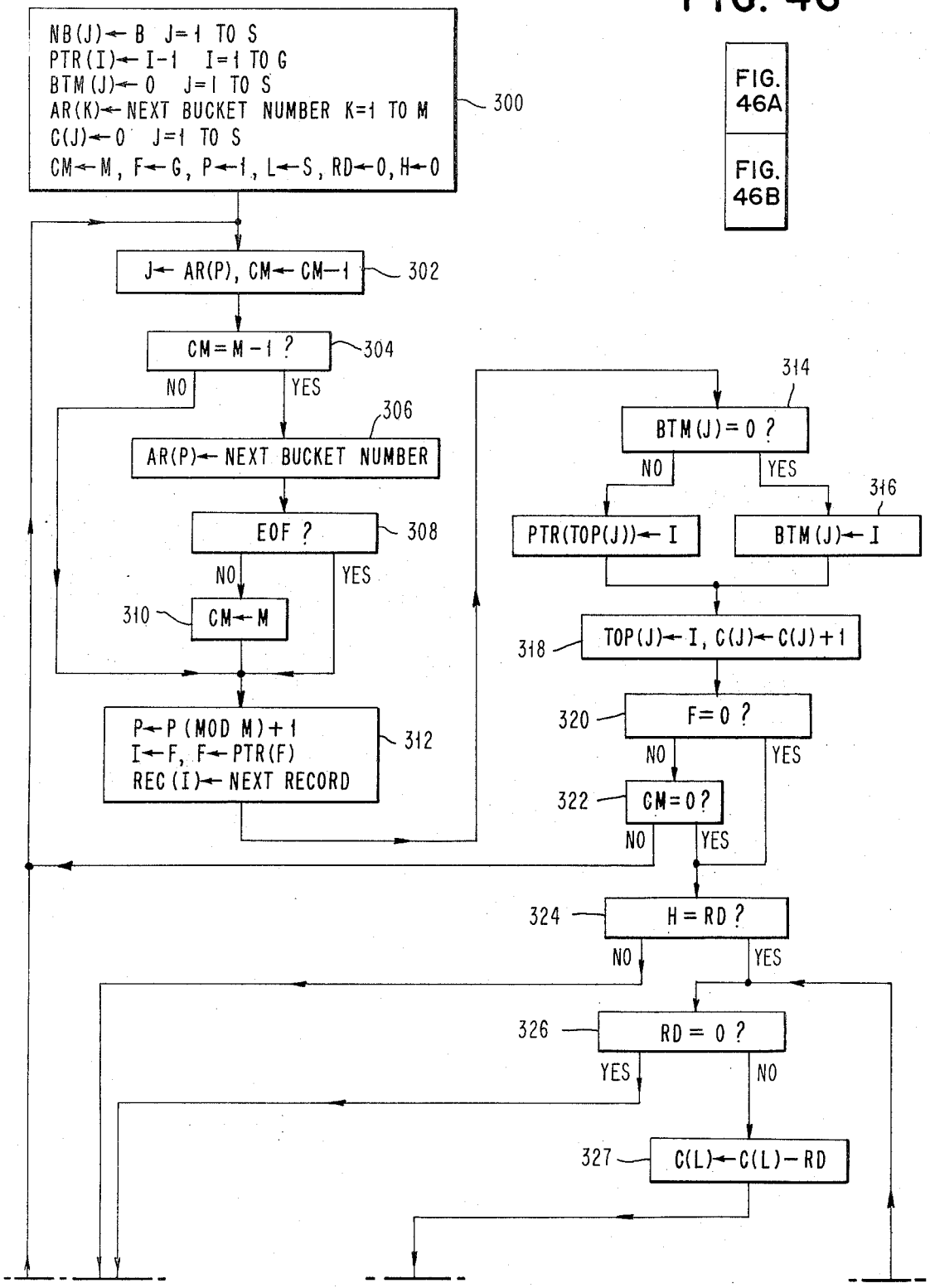
Figure 46B:
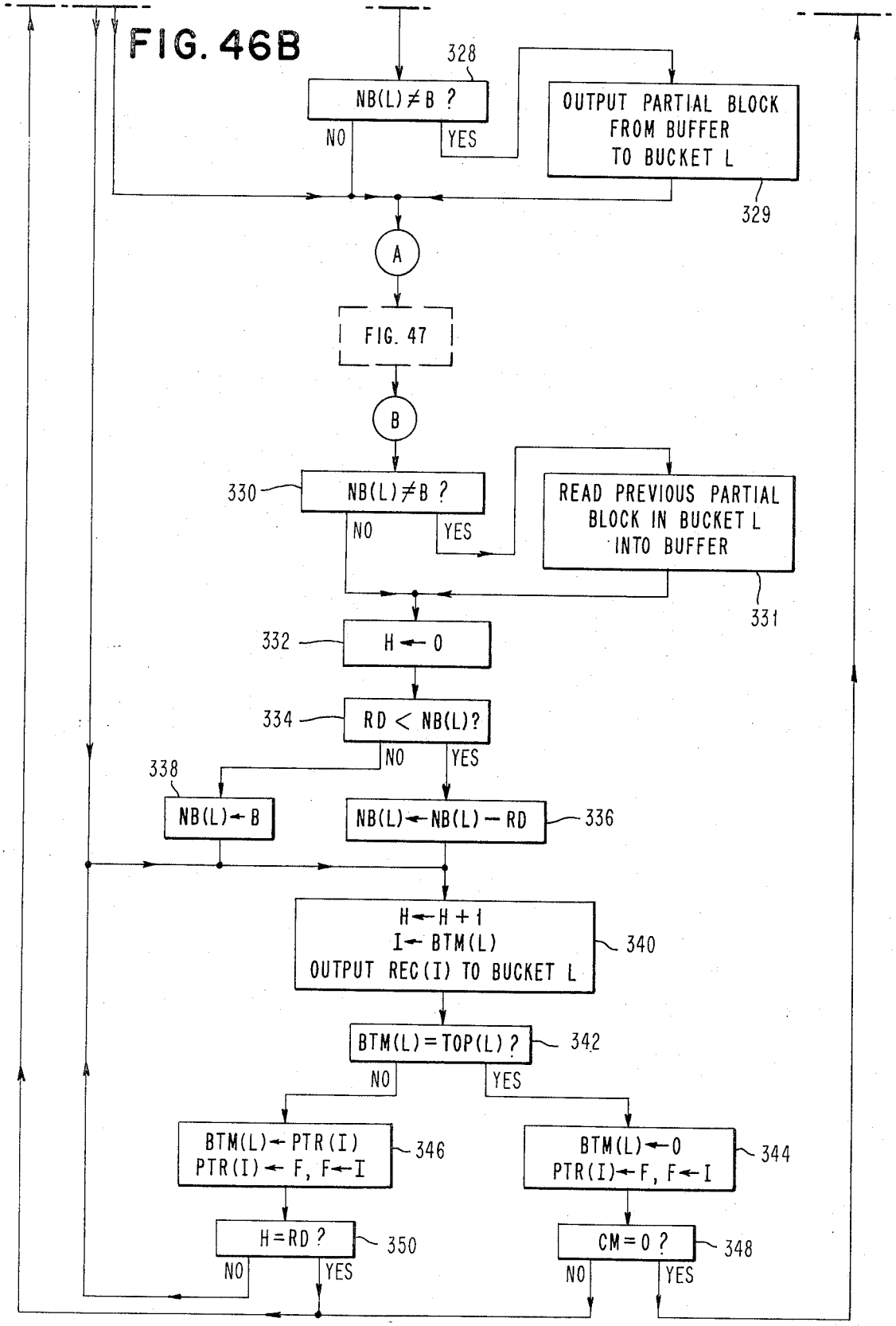
Figure 47:
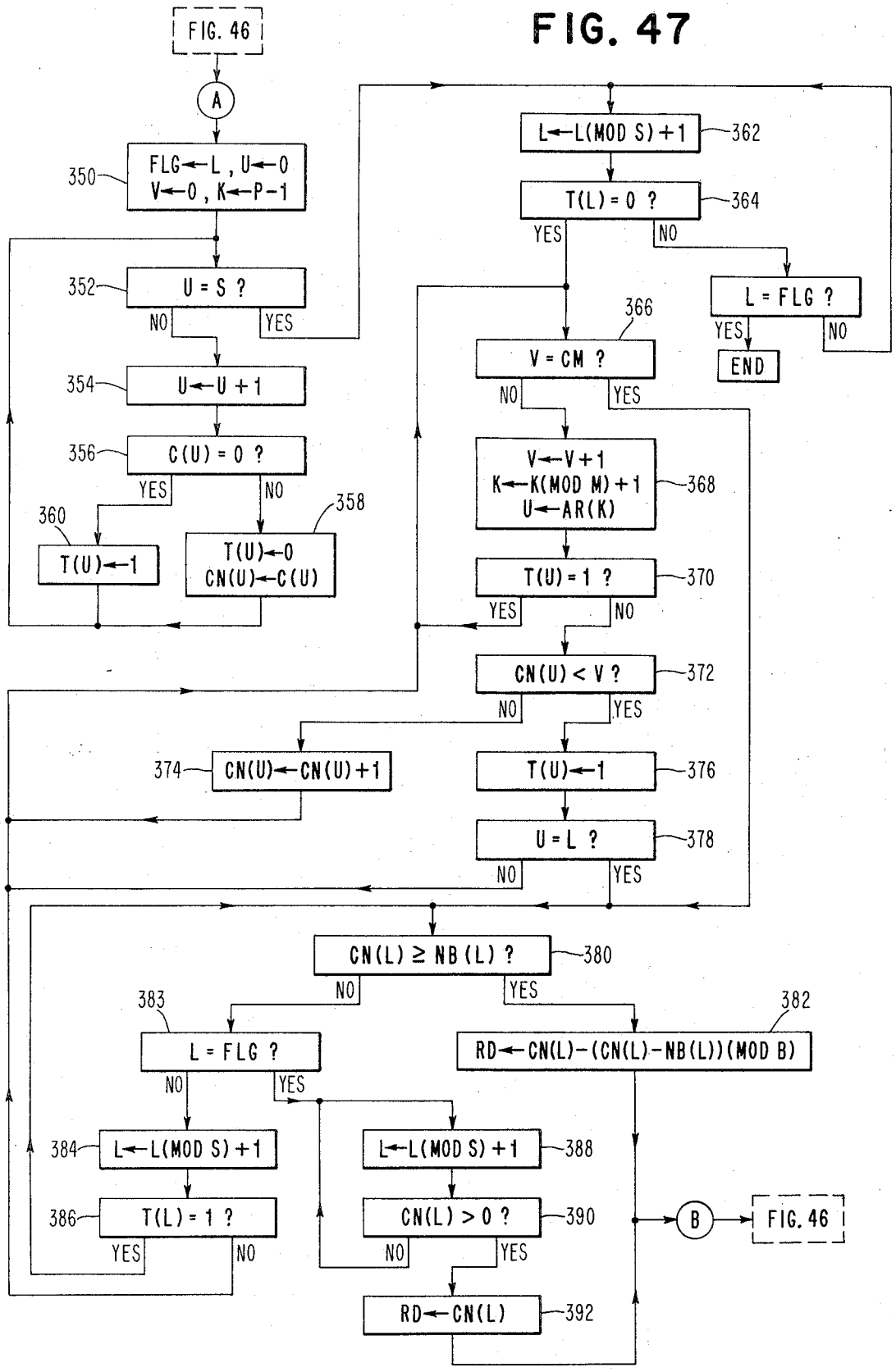
Figures 62A, 62B, 62C:
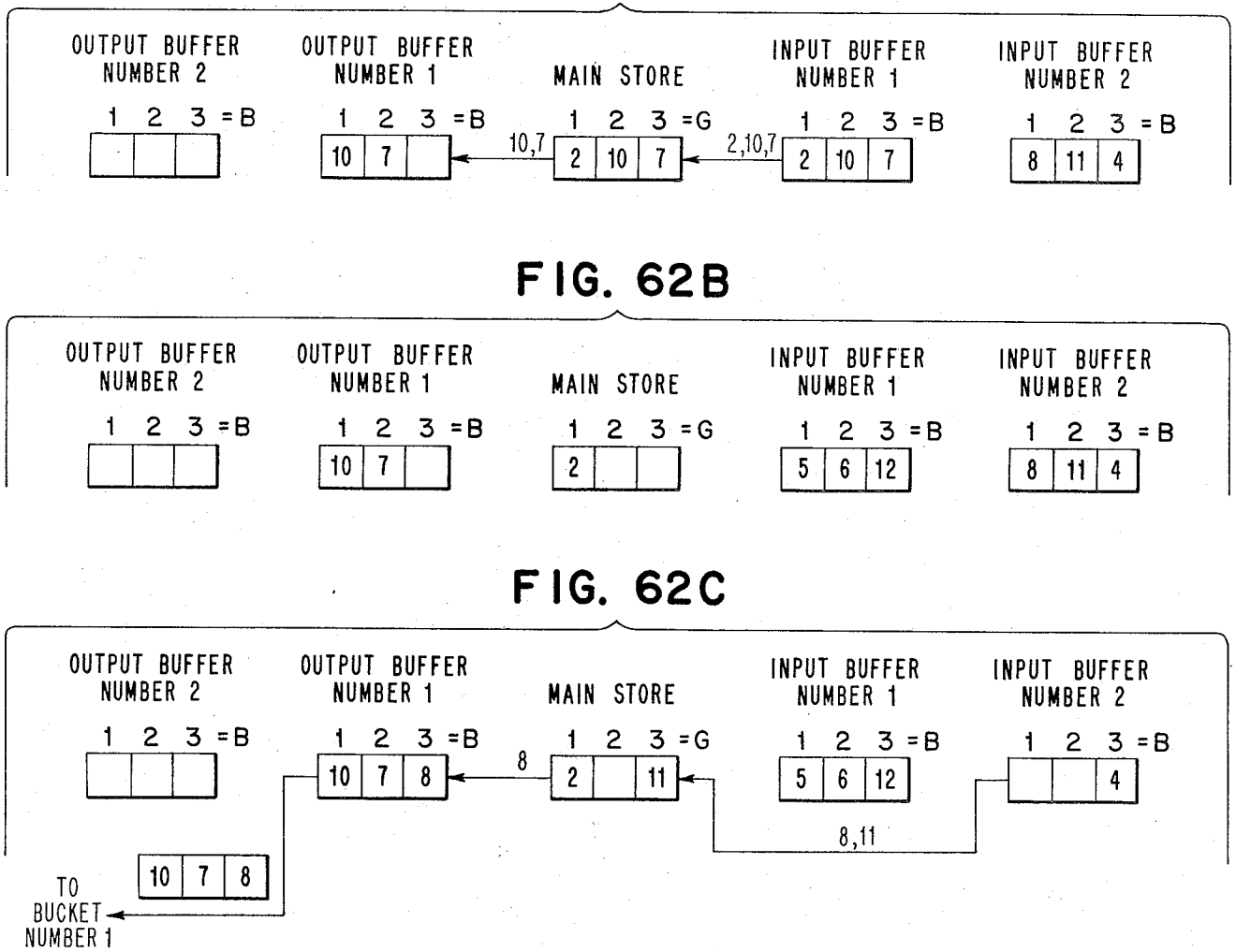
Figure 62D:
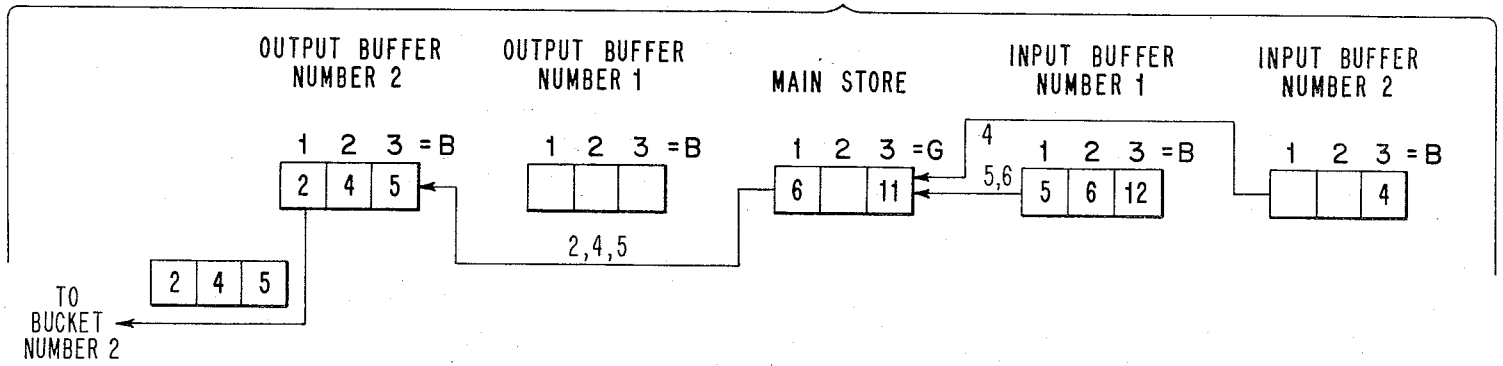
Figure 62E:
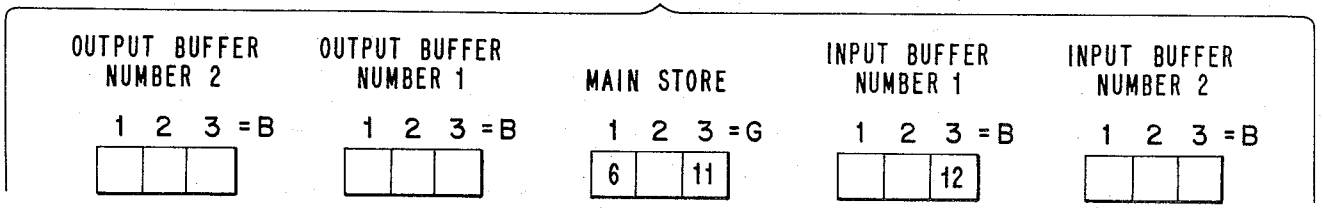
Figure 63C:
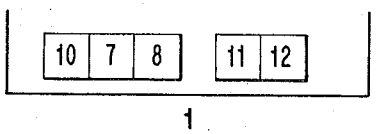
Figure 63B:
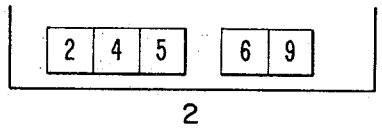
Figure 63A:
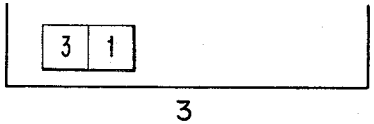

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 23, 1974

921 O.G. 1308

T921,028
SORT PROCESS

Brian T. Bennett, Mohegan Lake, and Archie C. McKellar, Mount Kisco, N.Y., assignors to International Business Machines Corporation, Armonk, N.Y.

Continuation of application Ser. No. 208,546, Dec. 16, 1971. This application Sept. 17, 1973, Ser. No. 398,620
Int. Cl. G06f *9/12*
U.S. Cl. 444—1
22 Sheets Drawing. 68 Pages Specification

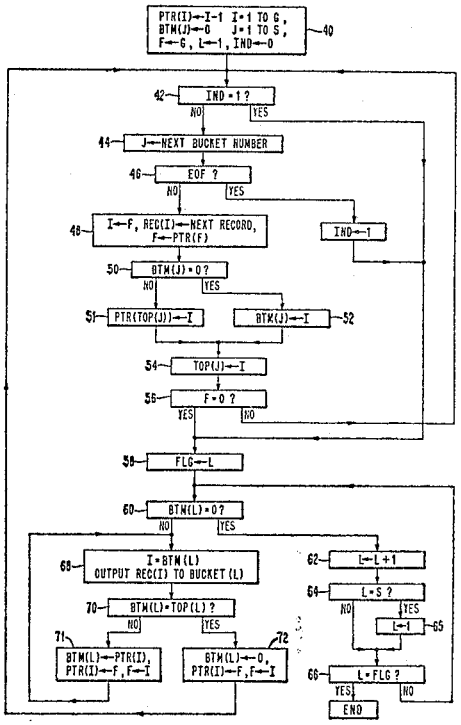

A distribution sort process is provided which results in the distribution of the records of a file into a plurality of buckets such that, the distributed records can be recovered in sequential order of key value in a one sort pass. In the process, the tags of the records are first sorted into sequential order by key value (a tag including a record's key and its address in the file). The address portions of the tags as they are arranged in the tag sort are then sorted into a set of numbered substrings by a modification of a conventional internal sort method such as replacement selection. The substrings then are merged into a final string. In the merge, the string number is added to the tag, and the key and address portion may be deleted to leave a list of string numbers which lie in the same order as the records in the file. A distribution sort is then performed on the records by distributing them into a quantity of buckets equal to the quantity of substrings produced in the internal sort of the addresses, the buckets being numbered to correspond to the numbering of the substrings. The distribution sort is designed such that the records distributed to a given bucket are those whose addresses are in the substring which has the same number as the bucket. The buckets are arranged in sequential order of numerical value. At the completion of the distribution sort, a single sort pass of the distributed records produces a string of records arranged in sequential order of key value. The distribution phase can either be single- or multi-pass. The invention contemplates an arrangement where the buckets can be visited cyclically for distributions of records thereinto or they can be selected for visitation in accordance with chosen criteria. The invention enables the use of buckets whose size is on an average twice as large as the main store and makes possible advantageous minimization of seek and latency times.

SORT PROCESS

Original Filed Dec. 16, 1971 22 Sheets-Sheet 1

| | 1 | 2 | 3 | 4 | 5 | 6 | 7 | 8 | 9 | 10 | 11 | 12 | = ADDRESSES |
|---|---|---|---|---|---|---|---|---|---|---|---|---|---|
| F = | 2 | 10 | 7 | 8 | 11 | 4 | 5 | 6 | 12 | 3 | 9 | 1 | |

| $D_S$ = | 1 | 2 | 3 | 4 | 5 | 6 | 7 | 8 | 9 | 10 | 11 | 12 | KEY |
|---|---|---|---|---|---|---|---|---|---|---|---|---|---|
| | 12 | 1 | 10 | 6 | 7 | 8 | 3 | 4 | 11 | 2 | 5 | 9 | AD |

INVENTORS
BRIAN T. BENNETT
ARCHIE C. McKELLAR

BY Isidore Match
ATTORNEY

| | | | | |
|---|---|---|---|---|
| 9 | 5 | 4 | 3 | 2 |

(STRING 1)

| | | | | |
|---|---|---|---|---|
| 11 | 8 | 7 | 6 | 1 |

(STRING 2)

| | |
|---|---|
| 12 | 10 |

(STRING 3)

| | | | | | | | | | | | |
|---|---|---|---|---|---|---|---|---|---|---|---|
| 1 | 2 | 3 | 4 | 5 | 6 | 7 | 8 | 9 | 10 | 11 | 12 |

| | | | | | | | | | | | |
|---|---|---|---|---|---|---|---|---|---|---|---|
| 2 | 1 | 1 | 1 | 1 | 2 | 2 | 2 | 1 | 3 | 2 | 3 |

FIG. 6C F =

| | | | | | | | | | | | |
|---|---|---|---|---|---|---|---|---|---|---|---|
| 2 | 10 | 7 | 8 | 11 | 4 | 5 | 6 | 12 | 3 | 9 | 1 |

SORT PROCESS

Original Filed Dec. 16, 1971 22 Sheets-Sheet 3

FIG. 8A

| | 1 | 2 | 3 = G |
|---|---|---|---|
| REC | | | |
| PTR | 0 | 1 | 2 |

F

FIG. 8B

| | 1 | 2 | 3 = G |
|---|---|---|---|
| REC | 7 | | 2 |
| PTR | 0 | 0 | 2 |

F

FIG. 8C

| | 1 | 2 | 3 = G |
|---|---|---|---|
| REC | | | 2 |
| PTR | 0 | 1 | 2 |

F

FIG. 9A

| | 1 | 2 | 3 |
|---|---|---|---|
| BTM | 0 | 0 | 0 |

FIG. 9B

| | 1 | 2 | 3 |
|---|---|---|---|
| BTM | 1 | 3 | 0 |

FIG. 9C

| | 1 | 2 | 3 |
|---|---|---|---|
| BTM | 0 | 3 | 0 |

FIG. 10A

L 1

FIG. 10B

L 1

FIG. 10C

L 1

FIG. 11A

I 3

FIG. 11B

I 2

FIG. 11C

I 2

FIG. 12A

| | 1 | 2 | 3 |
|---|---|---|---|
| TOP | 1 | 3 | 0 |

FIG. 12B

| | 1 | 2 | 3 |
|---|---|---|---|
| TOP | 2 | 3 | 0 |

FIG. 16A F 2

FIG. 16B F 2

| FIG. 19A | FIG. 19B |
|---|---|

FIG. 20A

| | 1 | 2 | 3 = G |
|---|---|---|---|
| REC | 0 | 0 | 0 |
| PTR | 0 | 1 | 2 |

FIG. 21A

| | 1 | 2 | 3 = S |
|---|---|---|---|
| BTM | 0 | 0 | 0 |

FIG. 20B

| | 1 | 2 | 3 = G |
|---|---|---|---|
| REC | 7 | 10 | 2 |
| PTR | 0 | 1 | 2 |

FIG. 21B

| | 1 | 2 | 3 = S |
|---|---|---|---|
| BTM | 2 | 3 | 0 |

FIG. 20C

| | 1 | 2 | 3 = G |
|---|---|---|---|
| REC | | | 2 |
| PTR | 2 | 0 | 2 |

FIG. 21C

| | 1 | 2 | 3 = S |
|---|---|---|---|
| BTM | 0 | 3 | 0 |

FIG. 22A

| | 1 | 2 | 3 = M |
|---|---|---|---|
| AR | 2 | 1 | 1 |

FIG. 23A

| | | | |
|---|---|---|---|
| C | 0 | 0 | 0 |

FIG. 24A

| | |
|---|---|
| CM | 3 |

FIG. 25A

| | |
|---|---|
| F | 3 |

FIG. 22B

| | 1 | 2 | 3 = M |
|---|---|---|---|
| AR | 1 | 1 | 2 |

FIG. 23B

| | 1 | 2 | 3 = S |
|---|---|---|---|
| C | 2 | 1 | 0 |

FIG. 24B

| | |
|---|---|
| CM | 3 |

FIG. 25B

| | |
|---|---|
| F | 0 |

FIG. 23C

| | 1 | 2 | 3 = S |
|---|---|---|---|
| C | 0 | 1 | 0 |

FIG. 25C

| | |
|---|---|
| F | 1 |

| | 1 | 2 | 3 = S |
|---|---|---|---|
| TOP | 1 | 3 | 0 |

| | 1 | 2 | 3 = S |
|---|---|---|---|
| CN | 2 | 1 | 0 |

| | 1 | 2 | 3 = S |
|---|---|---|---|
| T | 0 | 0 | 1 |

| | 1 | 2 | 3 = S |
|---|---|---|---|
| CN | 4 | 2 | 0 |

| | 1 | 2 | 3 = S |
|---|---|---|---|
| T | 0 | 1 | 1 |

| | |
|---|---|
| CT | 1 |

| | |
|---|---|
| CT | 2 |

| | |
|---|---|
| L | 1 |

| | |
|---|---|
| L | 2 |

SORT PROCESS

Original Filed Dec. 16, 1971 22 Sheets-Sheet 12

FIG. 33 TRACE FOR PASS 1

| |
|---|
| 16,0 BNDS (BUCKET NUMBERS 1, . . . . . ,16 IN ADDRESS ORDER) |

FIG. 34 SUPERBUCKETS FOR PASS 2 (PRODUCED BY PASS 1)

| | | |
|---|---|---|
| RECORDS WITH BUCKET NUMBERS 12-16 | RECORDS WITH BUCKET NUMBERS 7-11 | RECORDS WITH BUCKET NUMBERS 1-6 |
| 3 | 2 | 1 |

FIG. 35 SUBTRACES FOR PASS 2 (PRODUCED BY PASS 1)

| | | |
|---|---|---|
| 16,11 BNDS (BUCKET NUMBERS 12-16 IN ADDRESS ORDER) | 11,6 BNDS (BUCKET NUMBERS 7-11 IN ADDRESS ORDER) | 6,0 BNDS (BUCKET NUMBERS 1-6 IN ADDRESS ORDER) |
| 3 | 2 | 1 |

FIG. 36 SUPERBUCKETS FOR PASS 3 (PRODUCED BY PASS 2 FOR SUPERBUCKET 3)

| | | |
|---|---|---|
| 3 | 2 | 1 |
| RECORDS WITH BUCKET NUMBER 16 | RECORDS WITH BUCKET NUMBERS 14 & 15 | RECORDS WITH BUCKET NUMBERS 12 & 13 |
| 9 | 8 | 7 |

FIG. 37 SUBTRACES FOR PASS 3 (PRODUCED BY PASS 2 FOR SUBTRACE 3)

| | | |
|---|---|---|
| 3 | 2 | 1 |
| 16,15 BNDS (BUCKET NUMBER 16 IN ADDRESS ORDER) | 15,13 BNDS (BUCKET NUMBERS 14 & 15 IN ADDRESS ORDER) | 13,11 BNDS (BUCKET NUMBERS 12 & 13 IN ADDRESS ORDER) |
| 9 | 8 | 7 |

FIG. 38 SUPERBUCKETS FOR PASS 3 (PRODUCED BY PASS 2 FOR SUPERBUCKET 2)

| | | |
|---|---|---|
| 3 | 2 | 1 |
| RECORDS WITH BUCKET NUMBER 11 | RECORDS WITH BUCKET NUMBERS 10 & 9 | RECORDS WITH BUCKET NUMBERS 8 & 7 |
| 6 | 5 | 4 |

SUBTRACES FOR PASS 3
(PRODUCED BY PASS 2 FOR SUBTRACE)

SUPERBUCKETS FOR PASS 3
(PRODUCED BY PASS 2 FOR SUPERBUCKET 1)

SUBTRACES FOR PASS 3
(PRODUCED BY PASS 2 FOR SUBTRACE 1)

BUCKETS RESULTING FROM PASS 3

FIG. 48A

| | 1 | 2 | 3 = S |
|---|---|---|---|
| NB | 3 | 3 | 3 |

FIG. 49A

| | 1 | 2 | 3 = G |
|---|---|---|---|
| REC | | | |
| PTR | 0 | 1 | 2 |

FIG. 48B

| | 1 | 2 | 3 = S |
|---|---|---|---|
| NB | 3 | 3 | 3 |

FIG. 49B

| | 1 | 2 | 3 = G |
|---|---|---|---|
| REC | 7 | 10 | 2 |
| PTR | 0 | 1 | 2 |

FIG. 49C

| | 1 | 2 | 3 = G |
|---|---|---|---|
| REC | | | 2 |
| PTR | 2 | 0 | 2 |

FIG. 50A

| | 1 | 2 | 3 = S |
|---|---|---|---|
| BTM | 0 | 0 | 0 |

FIG. 51A

| | 1 | 2 | 3 = M |
|---|---|---|---|
| AR | 2 | 1 | 1 |

FIG. 50B

| | 1 | 2 | 3 = S |
|---|---|---|---|
| BTM | 2 | 3 | 0 |

FIG. 51B

| | 1 | 2 | 3 = M |
|---|---|---|---|
| AR | 1 | 1 | 2 |

FIG. 50C

| | 1 | 2 | 3 = S |
|---|---|---|---|
| BTM | 0 | 3 | 0 |

FIG. 52A

| | 1 | 2 | 3 = J |
|---|---|---|---|
| C | 0 | 0 | 0 |

FIG. 53A

| | |
|---|---|
| CM | 3 |

FIG. 54A

| | |
|---|---|
| F | 3 |

FIG. 52B

| | 1 | 2 | 3 = J |
|---|---|---|---|
| C | 2 | 1 | 0 |

FIG. 53B

| | |
|---|---|
| CM | 3 |

FIG. 54B

| | |
|---|---|
| F | 0 |

FIG. 55A

| | |
|---|---|
| P | 1 |

FIG. 56A

| | |
|---|---|
| L | 3 |

FIG. 57A

| | |
|---|---|
| RD | 0 |

FIG. 58A

| | |
|---|---|
| H | 0 |

FIG. 55B

| | |
|---|---|
| P | 1 |

FIG. 56B

| | |
|---|---|
| L | 1 |

FIG. 57B

| | |
|---|---|
| RD | 3 |

FIG. 58B

| | |
|---|---|
| H | 2 |

FIG. 59

| | 1 | 2 | 3 = S |
|---|---|---|---|
| TOP | 1 | 3 | 0 |

FIG. 60A

| | 1 | 2 | 3 = S |
|---|---|---|---|
| CN | 2 | 1 | 0 |

FIG. 61A

| | 1 | 2 | 3 = S |
|---|---|---|---|
| T | 0 | 0 | 1 |

FIG. 60B

| | 1 | 2 | 3 = S |
|---|---|---|---|
| CN | 4 | 1 | 0 |

FIG. 61B

| | 1 | 2 | 3 = S |
|---|---|---|---|
| T | 0 | 1 | 1 |